US008454428B2

(12) United States Patent
Pacey et al.

(10) Patent No.: US 8,454,428 B2
(45) Date of Patent: Jun. 4, 2013

(54) GAMING MACHINE PERFORMING REAL-TIME 3D RENDERING OF GAMING EVENTS

(75) Inventors: Larry J. Pacey, Prospect Heights, IL (US); Jason C. Gilmore, Bartlett, IL (US); Michael P. Casey, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 819 days.

(21) Appl. No.: 10/657,650

(22) Filed: Sep. 8, 2003

(65) Prior Publication Data

US 2004/0053686 A1 Mar. 18, 2004

Related U.S. Application Data

(60) Provisional application No. 60/410,039, filed on Sep. 12, 2002.

(51) Int. Cl.
*A63F 13/02* (2006.01)
*A63F 13/10* (2006.01)

(52) U.S. Cl.
USPC .............................................. 463/22; 463/31

(58) Field of Classification Search
USPC ......... 345/422, 473–475, 949–960, 652–654, 345/663–665, 678–680; 463/1, 11–34, 2–8, 463/40–43; 273/292, 317.1, 317.3, 317.5, 273/317.6, 108, 108.1, 108.3, 4, 138.1, 139, 273/142 R, 142 A, 142 F, 142 G, 142 H, 273/142 HA, 146, 460, 108.4; 434/247, 249, 434/251; 708/250–256; 703/1, 6, 7
See application file for complete search history.

(56) References Cited

U.S. PATENT DOCUMENTS

| | | | | | |
|---|---|---|---|---|---|
| 4,527,798 | A | * | 7/1985 | Siekierski et al. | 463/17 |
| 4,871,171 | A | * | 10/1989 | Rivero | 463/20 |
| 4,926,327 | A | * | 5/1990 | Sidley | 463/13 |
| 5,263,715 | A | * | 11/1993 | Matsumoto et al. | 463/22 |
| 5,301,118 | A | * | 4/1994 | Heck et al. | 700/109 |
| 5,324,035 | A | * | 6/1994 | Morris et al. | 463/42 |
| 5,380,007 | A | * | 1/1995 | Travis et al. | 463/18 |
| 5,411,258 | A | * | 5/1995 | Wilson et al. | 463/6 |

(Continued)

FOREIGN PATENT DOCUMENTS

| | | |
|---|---|---|
| EP | 1 029 569 A2 * | 8/2000 |
| GB | 2144644 | 3/1985 |

(Continued)

OTHER PUBLICATIONS

Bourg, Physics for Game Developers, 2002, O'Reilly, Chapters 2,4,5,6,11,13-16.*

(Continued)

*Primary Examiner* — David L Lewis
*Assistant Examiner* — Matthew D. Hoel
(74) *Attorney, Agent, or Firm* — Nixon Peabody LLP

(57) ABSTRACT

A gaming machine uses mathematical modeling and graphical displays to provide players with realistic depictions of gaming activities for wagering. Three-dimensional mathematical models are used to simulate real-world interactions of physical objects, with a display showing the player a visual representation of the game interactions. By providing the player with a realistic depiction of real-world gaming activities, a gaming machine according to the present invention involves the player in the wagered-upon activity to a greater extent than traditional gaming machines.

22 Claims, 9 Drawing Sheets

U.S. PATENT DOCUMENTS

| | | | | | |
|---|---|---|---|---|---|
| 5,435,554 | A | * | 7/1995 | Lipson | 463/3 |
| 5,564,701 | A | * | 10/1996 | Dettor | 463/16 |
| 5,616,078 | A | | 4/1997 | Oh | 463/8 |
| 5,775,993 | A | * | 7/1998 | Fentz et al. | 463/17 |
| 5,788,573 | A | * | 8/1998 | Baerlocher et al. | 463/16 |
| 5,860,862 | A | * | 1/1999 | Junkin | 463/40 |
| 6,015,346 | A | | 1/2000 | Bennett | 463/20 |
| 6,028,593 | A | * | 2/2000 | Rosenberg et al. | 345/156 |
| 6,045,446 | A | * | 4/2000 | Ohshima | 463/2 |
| 6,047,963 | A | * | 4/2000 | Pierce et al. | 273/121 B |
| 6,050,895 | A | * | 4/2000 | Luciano et al. | 463/7 |
| 6,067,096 | A | * | 5/2000 | Nagle | 345/473 |
| 6,080,063 | A | * | 6/2000 | Khosla | 463/42 |
| 6,089,976 | A | | 7/2000 | Schneider et al. | 463/16 |
| 6,099,409 | A | | 8/2000 | Brenner et al. | 463/40 |
| 6,102,798 | A | | 8/2000 | Bennett | 463/16 |
| 6,155,927 | A | * | 12/2000 | Levasseur et al. | 463/42 |
| 6,165,069 | A | * | 12/2000 | Sines et al. | 463/12 |
| 6,165,070 | A | * | 12/2000 | Nolte et al. | 463/20 |
| 6,190,255 | B1 | | 2/2001 | Thomas et al. | 463/20 |
| 6,191,798 | B1 | * | 2/2001 | Handelman et al. | 345/473 |
| 6,203,009 | B1 | * | 3/2001 | Sines et al. | 273/121 B |
| 6,231,443 | B1 | * | 5/2001 | Asai et al. | 463/32 |
| 6,256,040 | B1 | * | 7/2001 | Tanaka et al. | 345/421 |
| 6,257,983 | B1 | * | 7/2001 | Rimoto | 463/38 |
| 6,261,177 | B1 | | 7/2001 | Bennett | 463/16 |
| 6,267,669 | B1 | * | 7/2001 | Luciano et al. | 463/7 |
| 6,304,267 | B1 | * | 10/2001 | Sata | 345/427 |
| 6,306,036 | B1 | | 10/2001 | Burns et al. | 463/31 |
| 6,308,565 | B1 | * | 10/2001 | French et al. | 73/379.04 |
| 6,323,895 | B1 | * | 11/2001 | Sata | 348/39 |
| 6,340,332 | B1 | * | 1/2002 | Rimoto et al. | 463/31 |
| 6,343,987 | B2 | * | 2/2002 | Hayama et al. | 463/1 |
| 6,371,849 | B1 | * | 4/2002 | Togami | 463/4 |
| 6,394,901 | B1 | * | 5/2002 | Marta | 463/20 |
| 6,458,032 | B1 | * | 10/2002 | Yamagami | 463/9 |
| 6,508,709 | B1 | * | 1/2003 | Karmarkar | 463/42 |
| 6,554,707 | B1 | | 4/2003 | Sinclair et al. | 463/39 |
| 6,632,141 | B2 | * | 10/2003 | Webb et al. | 463/25 |
| 6,638,165 | B2 | * | 10/2003 | Uchiyama et al. | 463/20 |
| 6,652,377 | B1 | | 11/2003 | Moody | 463/13 |
| 6,666,766 | B2 | * | 12/2003 | Baerlocher et al. | 463/16 |
| 6,712,698 | B2 | * | 3/2004 | Paulsen et al. | 463/30 |
| 6,733,386 | B2 | * | 5/2004 | Cuddy et al. | 463/17 |
| 6,755,738 | B2 | * | 6/2004 | Glasson et al. | 463/19 |
| 6,769,982 | B1 | * | 8/2004 | Brosnan | 463/16 |
| 6,793,575 | B2 | * | 9/2004 | Brown et al. | 463/6 |
| 6,824,467 | B2 | * | 11/2004 | Schlottmann et al. | 463/20 |
| 6,866,585 | B2 | | 3/2005 | Muir | 463/31 |
| 6,887,157 | B2 | | 5/2005 | LeMay et al. | 463/32 |
| 7,112,133 | B2 | | 9/2006 | Lyons | 463/16 |
| 7,128,647 | B2 | | 10/2006 | Muir | 463/20 |
| 7,169,044 | B2 | * | 1/2007 | Baerlocher et al. | 463/20 |
| 2001/0001091 | A1 | * | 5/2001 | Asai et al. | 463/33 |
| 2001/0003712 | A1 | * | 6/2001 | Roelofs | 463/37 |
| 2002/0003537 | A1 | | 1/2002 | Higashiyama et al. | 345/422 |
| 2002/0016700 | A1 | * | 2/2002 | Furusu et al. | 703/6 |
| 2002/0019258 | A1 | * | 2/2002 | Kim et al. | 463/36 |
| 2002/0042703 | A1 | * | 4/2002 | Furusu et al. | 703/11 |
| 2002/0086728 | A1 | * | 7/2002 | Bennett et al. | 463/25 |
| 2002/0119815 | A1 | | 8/2002 | Lyons | 463/16 |
| 2003/0064783 | A1 | * | 4/2003 | Baerlocher et al. | 463/20 |
| 2003/0064805 | A1 | | 4/2003 | Wells | 463/39 |
| 2003/0069066 | A1 | | 4/2003 | Seelig et al. | 463/20 |
| 2003/0144049 | A1 | * | 7/2003 | Pacey | 463/16 |
| 2004/0002380 | A1 | * | 1/2004 | Brosnan et al. | 463/32 |
| 2004/0015953 | A1 | * | 1/2004 | Vincent | 717/173 |
| 2004/0029636 | A1 | | 2/2004 | Wells | 463/32 |
| 2004/0053686 | A1 | | 3/2004 | Pacey et al. | 463/25 |
| 2004/0077401 | A1 | | 4/2004 | Schlottmann | 463/20 |
| 2004/0077402 | A1 | | 4/2004 | Schlottmann | 463/20 |
| 2004/0077404 | A1 | | 4/2004 | Schlottmann et al. | 463/30 |
| 2004/0102244 | A1 | | 5/2004 | Kryuchkov et al. | |
| 2004/0102245 | A1 | | 5/2004 | Escalera et al. | |
| 2004/0192430 | A1 | | 9/2004 | Burak et al. | 463/20 |
| 2004/0266536 | A1 | | 12/2004 | Mattice et al. | 463/43 |
| 2005/0037843 | A1 | | 2/2005 | Wells et al. | 463/30 |
| 2005/0059487 | A1 | | 3/2005 | Wilder et al. | 463/32 |
| 2005/0075167 | A1 | | 4/2005 | Beaulieu et al. | 463/32 |
| 2005/0215319 | A1 | | 9/2005 | Rigopulos et al. | 463/32 |
| 2005/0233799 | A1 | | 10/2005 | LeMay et al. | 463/20 |
| 2005/0255908 | A1 | | 11/2005 | Wells | 463/20 |
| 2006/0052152 | A1 | | 3/2006 | Tedsen et al. | 463/16 |
| 2006/0058100 | A1 | | 3/2006 | Pacey et al. | 463/31 |
| 2006/0068900 | A1 | | 3/2006 | Englman | 463/25 |

FOREIGN PATENT DOCUMENTS

| | | | | |
|---|---|---|---|---|
| JP | 11-114225 | A | * | 4/1999 |
| WO | WO 98/09258 | | | 3/1998 |
| WO | WO 98/09259 | | | 3/1998 |
| WO | WO 01/35208 | A1 | | 5/2001 |
| WO | WO 01/80057 | A1 | | 10/2001 |
| WO | WO 2004/028650 | A1 | | 4/2004 |
| WO | WO 2004/029893 | A1 | | 4/2004 |
| WO | WO 2006/039257 | A1 | | 4/2006 |
| WO | WO 2006/039348 | A1 | | 4/2006 |
| WO | WO 2006/039371 | A2 | | 4/2006 |

OTHER PUBLICATIONS

"Physics for Game Developers," by David M. Bourg, (c) 2002 O'Reilly and Associates, Inc.*

"Top Gear Rally 2" manual, downloaded, Oct. 26, 2006 from www.replacementdocs.com.*

"Power Drive Rally" video game for the Atari Jaguar game system, (c) 1994 Atari Corporation, manual downloaded Oct. 26, 2006 from www.replacementdocs.com.*

"Scarne's Encyclopedia of Card Games," by John Scarne, © 1973 HarperCollins, pp. 7 to 55 (poker), pp. 278 to 292 (blackjack).*

Brochure: Family Feud Slots, Silicon Gaming, 6 pages.

Brochure: Top Hat Twenty One, Silicon Gaming © 1999, 2 pages.

Discreet Products—character studio, "Character Studio® 3," URL: http://www.discreet.com/products/cs/cs_overview.html.

Discreet Products—character studio, "Features and Benefits," URL: http://www.discreet.com/products/cs/cs_features.html, 6 pages.

Frauenfelder, Mark, "Smash Hits: Videogames are getting seriously physical: the engine is the real-time force of nature," Wired, Aug. 2001, URL: www.mathengine.com/_mathengine_corp/_news/wired.htm, 5 pages.

Lander, Jeff and Hecker, Chris; "Gama Networks Presents: Gamasutra.com—Product Review of Physics Engines, Part One: The Stress Tests," Sep. 13, 2000, © 2000-2001 CMP Media Inc., URL: http://www.gamasutra.com/features/20000913/lander_01.htm, 10 pages.

Mathengine Toolkit, "Karma," Mathengine enabling interactive media, URL: http://www.mathengine.com/_mathengine_corp/_products/toolkits.html, 2 pages.

* cited by examiner

GAMING MACHINE PERFORMING REAL-TIME 3D RENDERING OF GAMING EVENTS

CROSS-REFERENCE TO RELATED APPLICATION

This application claims the benefit of U.S. Provisional Patent Application Ser. No. 60/410,039, filed Sep. 12, 2002 and entitled "Gaming Machine Performing Real-Time 3D Rendering of Gaming Events," which is incorporated herein by reference in its entirety.

FIELD OF THE INVENTION

The present invention relates generally to gaming machines, and, more particularly, to a gaming machine which provides real-time graphical rendering of gaming events.

BACKGROUND OF THE INVENTION

Gaming machines, such as video slot machines, video poker machines, and the like, have been a cornerstone of the gaming industry for several years. Generally, the popularity of such machines with players is dependent upon a number of factors, including the likelihood (or perceived likelihood) of winning money at the machine or the intrinsic entertainment value of the machine relative to other available gaming options. In a modem casino, gaming machines compete with traditional styles of gaming (such as roulette, craps, and sports betting) for the attention of the player.

Gaming machines traditionally have been developed for the play of such games as slots, poker, bingo, keno, and blackjack. These genres of gaming machines are well-known to the gaming public and have sizable markets of their own. Still, there are many players who will generally not play gaming machines, or who only play gaming machines in limited amounts. Such players may stay away from gaming machines for the reason that they believe the machines to be "fixed," or destined to award small payoffs for wagers in comparison to other styles of gaming. Further, players may have grown attached to a certain style of gaming, such as sports betting or roulette, which is not accurately simulated by a gaming machine. In addition, traditional gaming machines only allow the player to wager on and interact with a limited amount of variables in an isolated interaction. Thus, gaming machines lack the appeal of interactions with real-world objects that other types of gaming allow.

A solution is needed, therefore, to address the foregoing disadvantages.

SUMMARY OF THE INVENTION

According to some embodiments of the present invention, a gaming machine presents a rendered event upon which the player wagers, allowing the player to see the outcome of the event and the outcome of his wager in real time.

Gaming machines and methods according to some embodiments of the present invention provide graphical depictions of events upon which a player wagers. Mathematical modeling of events may take place prior to or simultaneously with the graphical depiction of game events, and 3D processing may be used to enhance the visual depiction of the events and/or to facilitate the mathematical modeling of events.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

FIG. **7*a*** is an isometric view of a roulette game illustrating the computational basis of one embodiment of the present invention.

Figures 7A, 7B:
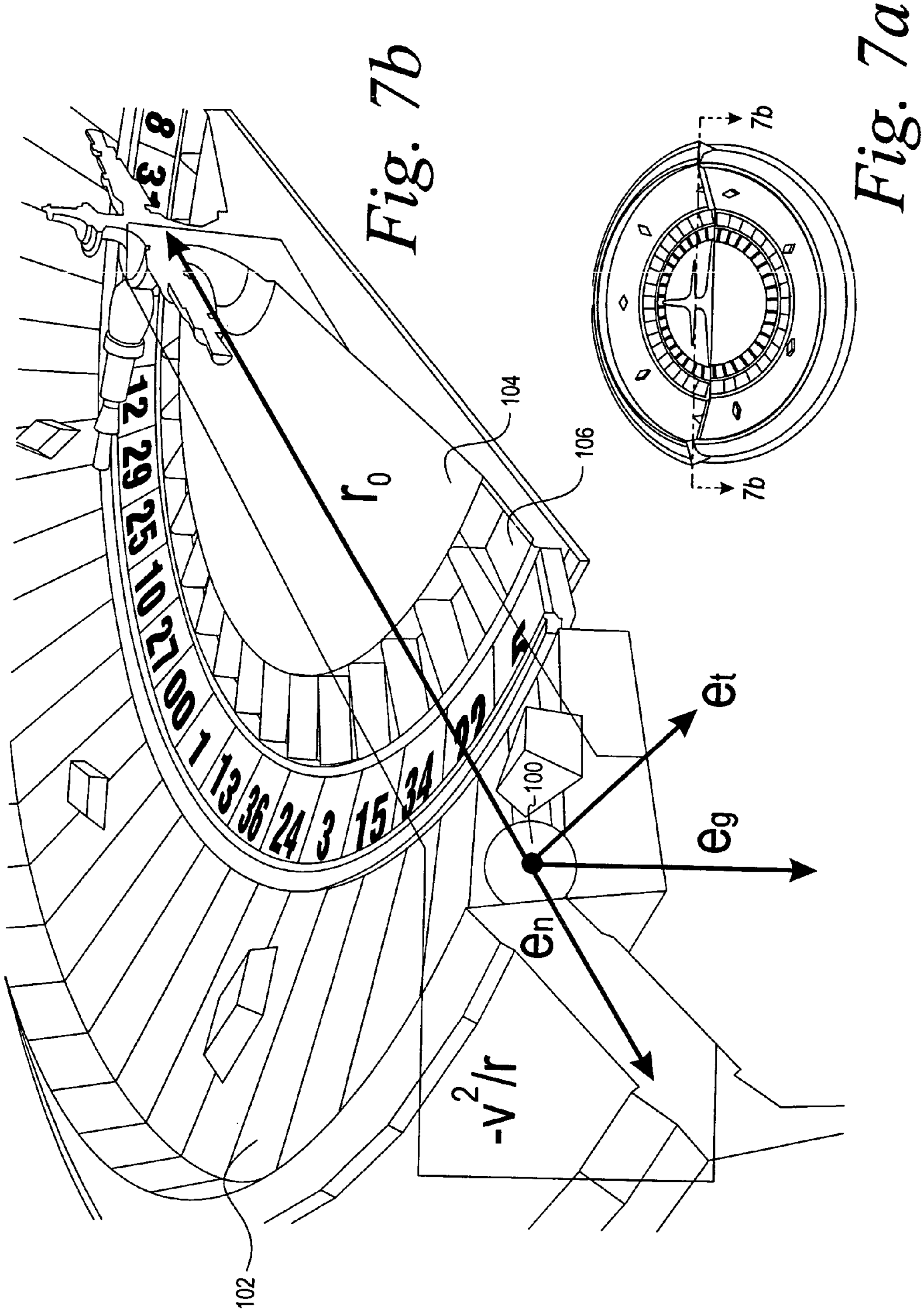

FIG. **7*b* is an enlarged cross-sectional view of the roulette game of FIG. 7*a* taken along the line 7*b*-7*b***.

FIG. **8*a*** is a top view of a roulette game illustrating the computational basis of one embodiment of the present invention.

Figure 8B:
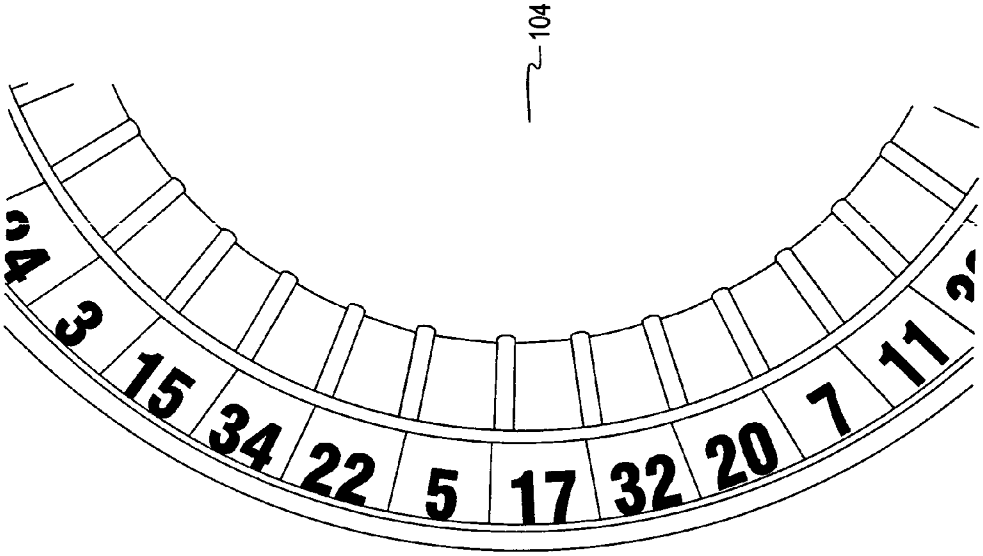
Figure 8A:
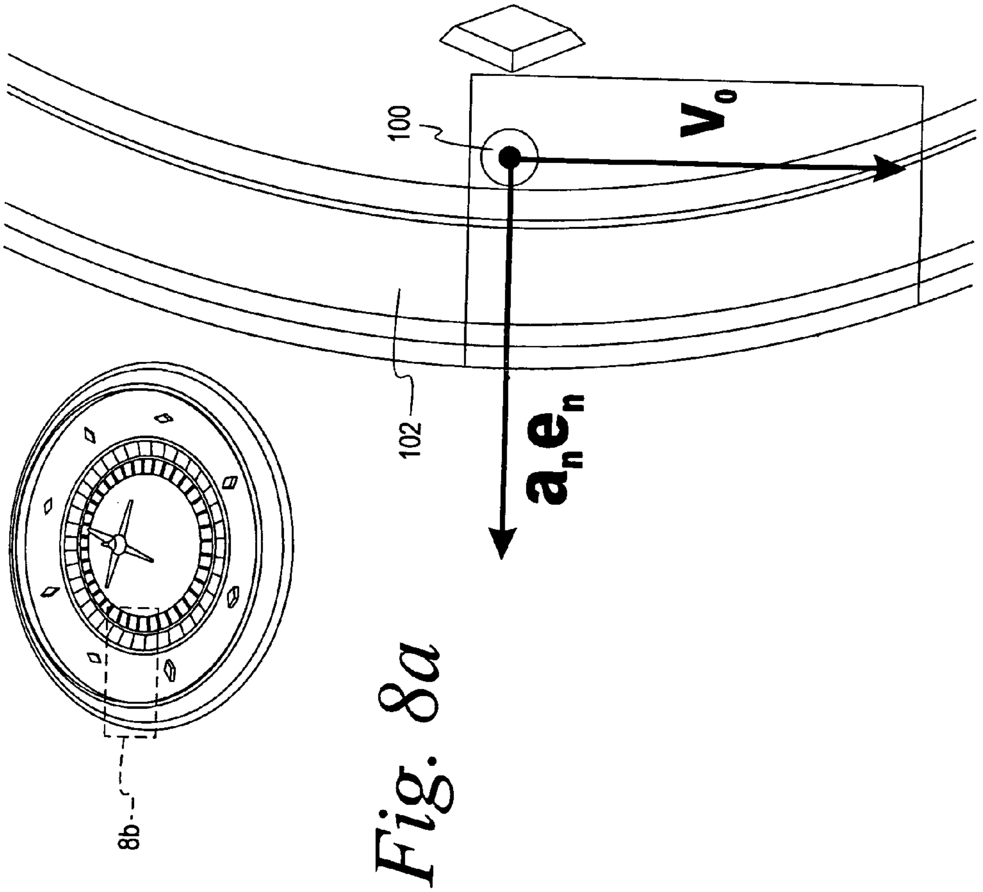

FIG. **8*b* is an enlarged detail view of the roulette game of FIG. 8*a* showing the position within the box 8*b***.

FIG. **9*a*** is a top view of a roulette game illustrating the computational basis of one embodiment of the present invention.

Figure 9B:
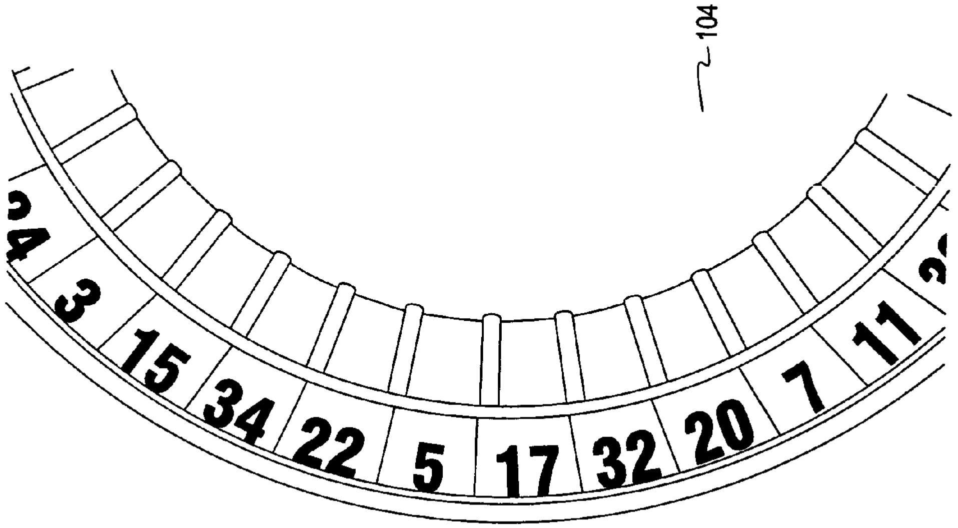
Figure 9A:
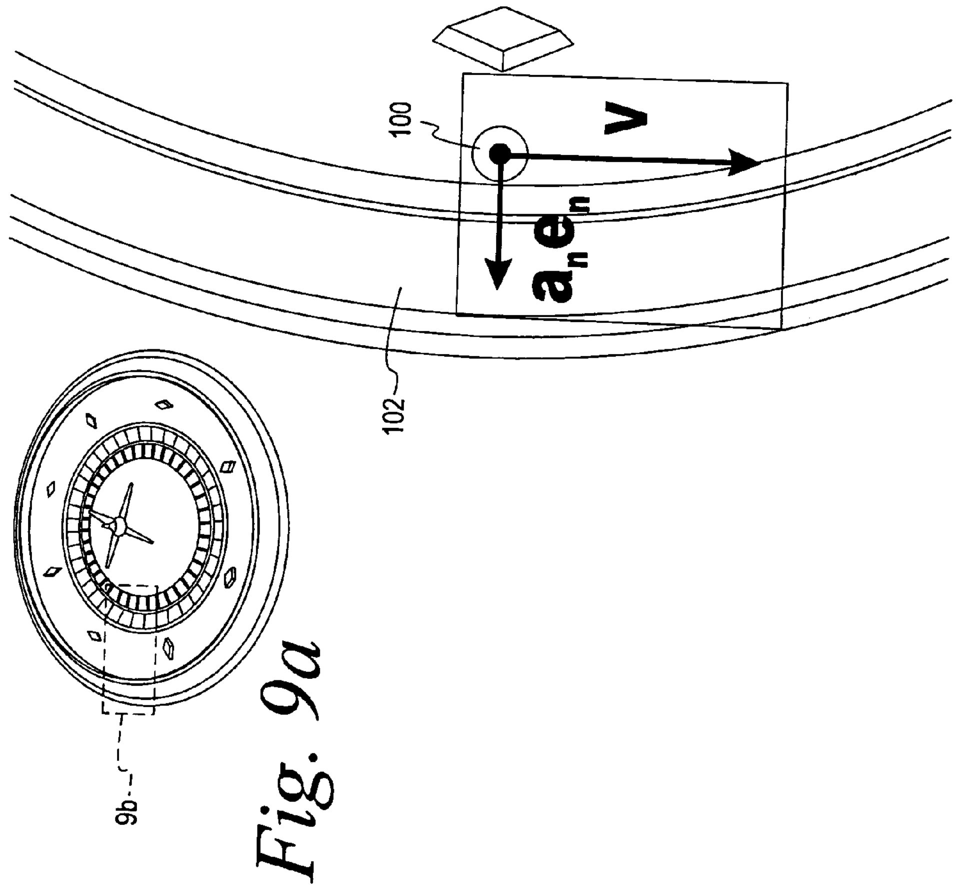

FIG. **9*b* is an enlarged detail view of the roulette game of FIG. 9*a* showing the portion within the box 9*b***.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Figure 1:
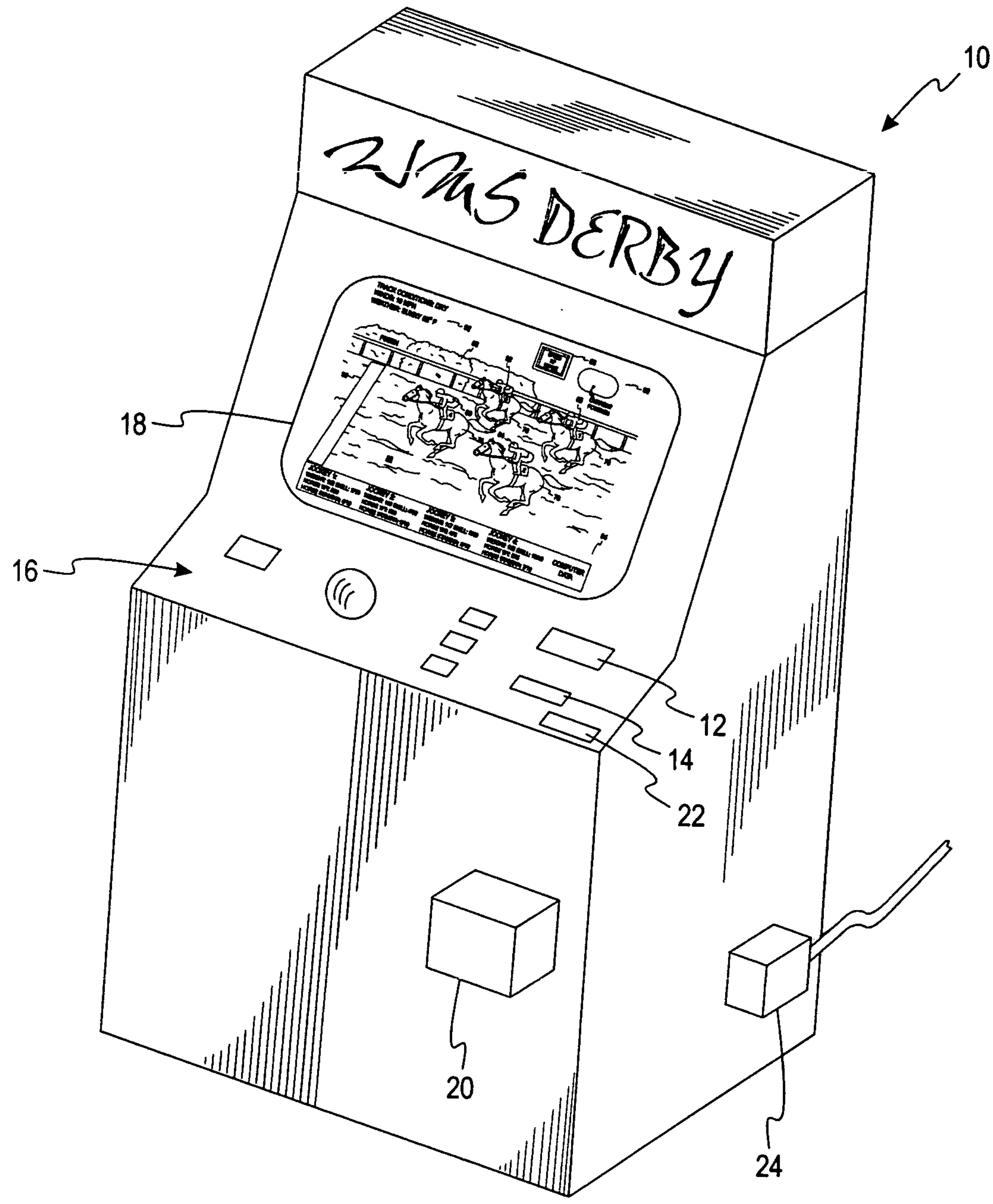
FIG. 1 is an isometric view of a gaming machine according to one embodiment of the present invention.

FIG. 1 shows an isometric view of a gaming device 10 according to one embodiment of the present invention. To use the gaming device 10, a player begins by inserting credits into the machine 10, for example through the use of a money acceptance slot 12 or a card reader 14. The player may then interact with control inputs 16 to place various types of wagers, as will be described in more detail below. The control inputs 16 may include buttons, joysticks, a mouse, a keyboard, trac-balls and/or other types of game control inputs. Further, the game machine 10 may incorporate a touch-screen control device.

Upon accepting a wager and any other input from a player, the gaming machine 10 displays game activity using a display 18, optionally in combination with audio output from speakers (not shown). Based on the outcome of the game activity, the gaming device may reward a player with a payoff via a coin chute 20 or by electronically awarding credits to the player. The gaming machine 10 may track player performance over time through the use of a player identification card reader 22, and may communicate with other gaming machines, servers, hosts, networks, or databases via a communication module 24.

Figure 2:
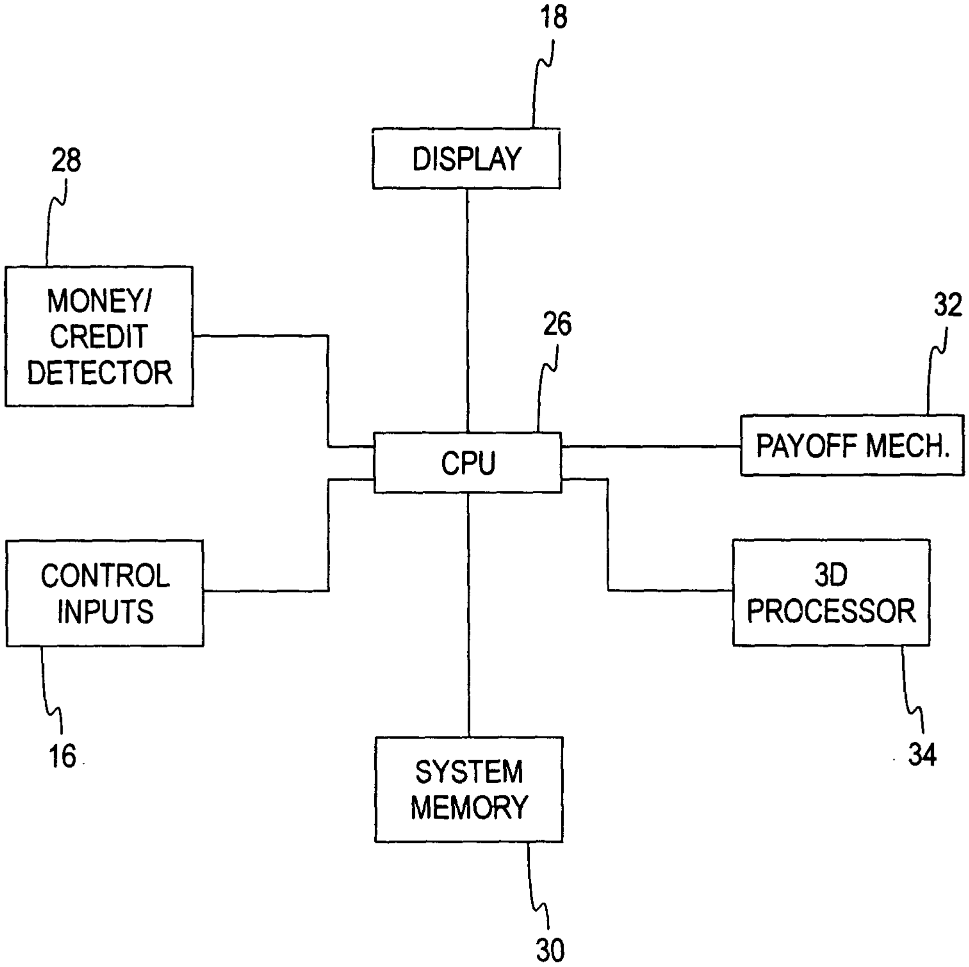
FIG. 2 is a functional block diagram of a gaming machine according to the present invention.

FIG. 2 illustrates the interactions that take place within the gaming machine 10 as a functional block diagram. The central processing unit ("CPU") 26 coordinates game control signals and tracks wagers and payoffs, among other tasks. A money/credit detector 28 signals the central processing unit 26 when a player has inserted money or placed a wager. The money may be provided by coins, bills, tickets, coupons, cards, etc. The CPU 26 executes game instructions, causing the display 18 to give a visual representation of game activity. According to a preferred embodiment of the present invention, the display 18 is used to display two-dimensional images of three-dimensional simulation forms. To receive a wager, the CPU 26 may prompt a player for wagering selections to be input through the control inputs 16.

A system memory 30 stores control software, operational instructions, and data associated with the gaming machine 10. In one embodiment, the system memory 30 comprises a separate read-only memory (ROM) and battery-backed random-access memory (RAM). However, it will be appreciated that the system memory 30 may be implemented on any of several alternative types of memory structures or may be implemented on a single memory structure. The system memory 30 may be augmented with information transmitted through the communication module 24 (shown in FIG. 1), such that information outside of the gambling machine 10 may be incorporated into a simulation for a wagering experience. A payoff mechanism 32 is operable in response to instructions from the CPU 26 to award a payoff to the player in response to any game outcomes that include a payoff. The payoff may, for example, be in the form of a number of credits. The payoff amount may be determined by pay tables or by game rules, as described more completely below. In some embodiments, the control inputs 16 may be used by the player for such actions as calling a casino attendant or for collecting any credits on the game's credit meter.

A 3D processor 34 may be used in conjunction with the CPU 26 to facilitate computation required for the rendering of three-dimensional objects on the display 18. According to one embodiment of the present invention, the payoff mechanism 32 may respond directly to outcomes from the 3D processor 34. The 3D processor 34, the CPU 26, or the two working in conjunction can be used to implement a physics engine which realistically animates physical objects within a simulation world corresponding to a game. According to one embodiment, the 3D processor 34 performs all 3D processing, allowing the CPU 26 to perform other tasks. According to another embodiment, the 3D processor 34 handles specific 3D processing tasks only when the CPU 26 is overburdened with other processing tasks.

Figure 3:
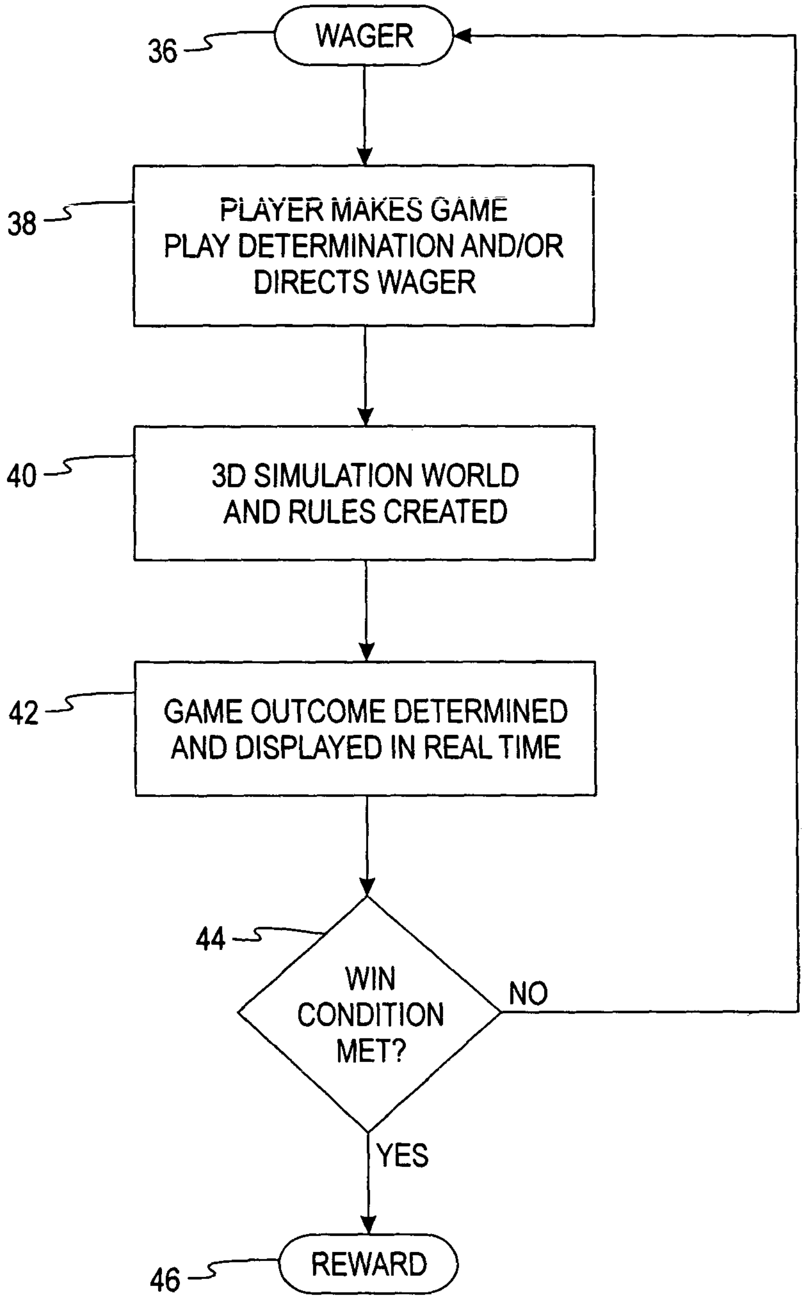
FIG. 3 is a flow chart showing the process of a performance and outcome of a game according to one embodiment of the present invention.

Turning now to FIG. 3, a flow chart shows the operation of a gaming machine 10 according to one embodiment of the present invention. In the embodiment of FIG. 3, the outcome of a game is simultaneously determined and displayed to the player. As shown at block 36, gaming begins when a player indicates a desire to place a wager. Next, as shown at block 38, the player makes a game play determination and/or directs the placement of the wager. For example, in a horse-racing embodiment of the present invention, the player could determine which horse to bet on at this stage, or set the type of wager—for example, win, place, or show—desired. Other embodiments of such decisions will be described in further detail below.

Next, as shown at block 40, the gaming machine creates a 3D, real-time simulation world within which game activities occur. In this context, the "world" may not be the entire world, but rather a physical domain within which game activities are performed. For example, if the gaming machine 10 is simulating a casino table game such as craps, the gaming "world" might consist of a bounded craps table and a pair of simulated dice. Similarly, a simulated world for use in a horse racing simulation might be quite large, encompassing an entire racing track along with several individual horses, each with a jockey. In a preferred embodiment, the simulation world is created by a combination of the CPU 26 and the 3D processor 34. For example, the CPU 26 may access rules relating to a world from the system memory 30 and forward those rules to the 3D processor 34 for graphical rendering of the effects of the rules on graphical objects within a simulated world. Alternatively, the 3D processor 34 may be designed to run simulations within a simulated world with physical properties closely mimicking the real world, so that the same general rules, such as the effects of gravity or the results of collisions, can be carried out from game to game without any need to update the 3D processor with new rules for different game types. At this point, the 3D simulation world may be merely numerical in nature, with the 3D processor 34 of the CPU 26 using the numerical world information to form a geometric world which can be shown to the player via the display 18.

Next, as shown at block 42, a game outcome is determined and displayed in real time. In a real time determination and display embodiment, game activity is shown on the display 18 at the same time that the underlying mathematical basis for the displayed game activity is being calculated. Thus, the player is actually shown the events of the game as they are occurring. Such so-called "rendering on the fly" may allow a player to interact with a gaming machine 10 during the display of game activity to alter the game outcome. For example, in an interactive horse racing simulation, rendering the activity in real time can give the player a choice to speed up a horse during the final stretch or conserve the horse's energy during the beginning and middle of a race. Likewise, in a simulated billiards game, the player may be allowed to make shot selections during the game that influence the game outcome. A player may further be given the opportunity to place new bets during the display of the simulated game or to alter current bets, with penalties where appropriate.

Next, at decision block 44, the game machine 10 determines whether the player has met winning conditions in the game. If one or more winning conditions are met, the player is rewarded with credits or money as shown at block 46. If no winning conditions are met, the player is given another opportunity to place a wager as shown at block 36.

As an example of a gaming experience on a gaming machine according to the embodiment of FIG. 3, a gaming machine featuring a horse race could simulate a race among four horses, each having a jockey. The system memory 30 of the gaming machine may be supplied with extensive information about each of the horses and each of the jockeys. For example, the system memory 30 may contain information such as each jockey's weight and skill (which might be determined from a racing history), each horse's weight and skill (such as its winning percentage, stamina, or performance in races having different conditions), and the race conditions (such as muddy, sunny, hot or cold). The number and complexity of variables provided in the system memory 30 is limited only by the size of the system memory 30 and the capabilities of the CPU 26 and/or the 3D processor 34 to process the required data in a reasonable time. In the case of the real-time game outcome determination and display of FIG. 3, the CPU 26 and/or the 3D processor 34 must be capable of processing the required data at least quickly enough to display the game activity at a real-time pace.

Figure 4:
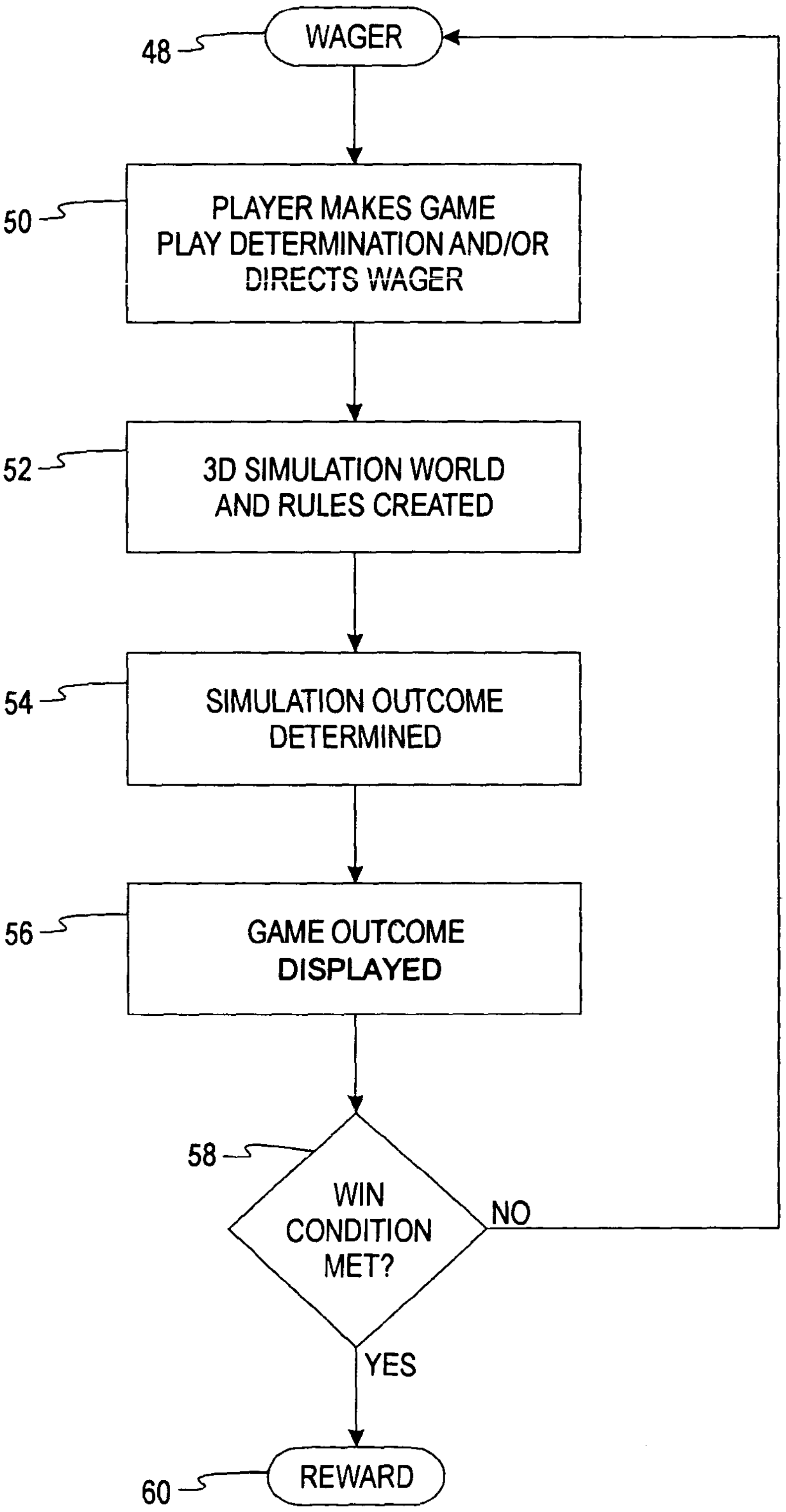
FIG. 4 is a flow chart showing the process of a performance and outcome of a game according to another embodiment of the present invention.

Turning now to FIG. 4, a flow chart shows the logic of a gaming machine according to the present invention using an alternative method for the computation and display of game outcomes. The embodiment shown in FIG. 4 uses the underlying numerical basis for real-world simulations to carry out mathematical simulations internally, such that the simulation outcome is "known" to the gaming machine before the gaming activity is shown to the player. A gaming machine according to this embodiment may be useful to implement in casinos subject to jurisdictional rules prohibiting "on-the-fly" game determinations in gaming machines, because outcomes determining award payoffs are predetermined within the gaming machine.

As shown in FIG. 4, gaming according to this embodiment begins similarly to gaming according to the embodiment of FIG. 3, with the player placing a wager as shown at block 48 and making a game play determination and/or directing the wager as shown at block 50. The 3D simulation world and rules are created, shown at block 52. The simulation outcome is then determined mathematically, as shown at block 54, and a game outcome corresponding to the simulation is displayed, as shown at block 56. Next, the gaming machine determines whether a win condition has been met at decision block 58. If a win condition has been met, the player is rewarded as shown at block 60, and if no win condition is met, the player is given the opportunity to wager once again as shown at block 48. Similarly to the embodiment of FIG. 3, a player of the embodiment of FIG. 4 may be given the option to modify a wager during the display of game events, with possible penalties for such modifications. According to one embodiment of the present invention, a simulation outcome is compared to possible wager outcomes to determine which of the wager outcomes either exactly or approximately best matches the simulation outcome.

A gaming machine according to the present invention may incorporate a hybrid of the embodiments shown in FIGS. 3 and 4, such that certain components of a simulation outcome are pre-computed but other components of game activity are computed and rendered in real time. For example, the winner of a four-horse race may be predetermined to be horse three, but during the race horses one, two, and four may appear to be headed for victory. The activity during the race may be altered from game to game to present the player with different visual experiences during multiple plays. Further, although the flow charts of FIGS. 3 and 4 show the creation of a 3D simulation world and rules following a wager, in an alternative embodiment the 3D simulation world and rules are pre-set such that this step may be skipped during individual game play sessions. It is to be understood that the principles of the present invention can be applied to a main game of a gaming machine or to a bonus game within a gaming machine.

According to one embodiment of the present invention, the mathematical basis of a gaming activity portrayed via a gaming machine 10 is based on real-world physics describing the interactions between physical objects. The mathematical basis for physical interactions between objects portrayed by a gaming machine 10 may be based on a readily available "physics engine" or program which is designed to realistically simulate a wide variety of physical phenomena, or separate underlying mathematical rules may be provided on a specialized basis for specific game actions to be simulated.

Figure 5:
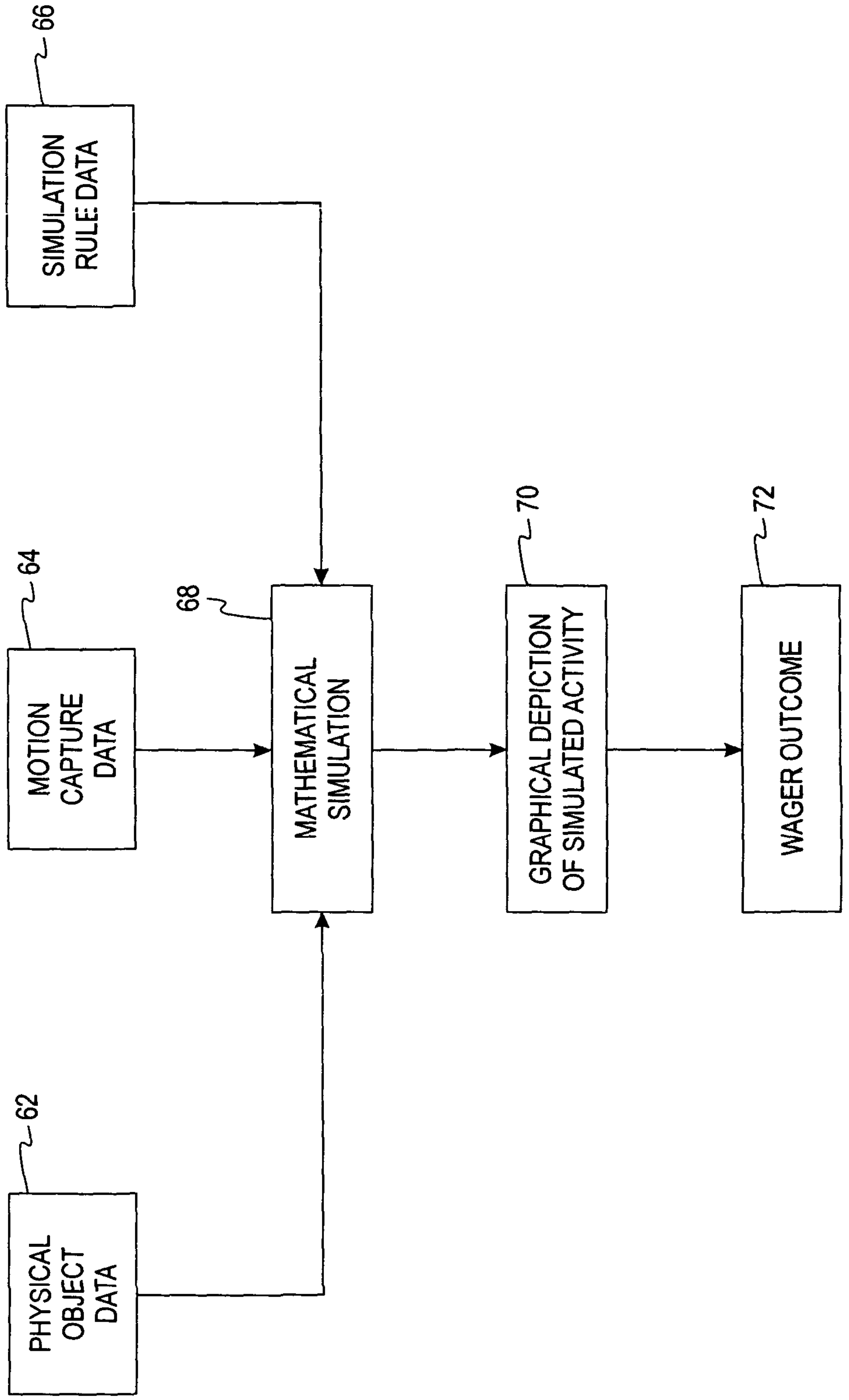
FIG. 5 is a functional diagram showing the flow of data according to one embodiment of the present invention.

A variety of types of data may be used to simulate game activities in the present invention, as will be further understood from the examples which follow. Several general data types are particularly beneficial, as shown in the information flow chart of FIG. 5. FIG. 5 shows the combination of different types of data used by a gaming machine according to the present invention and ways in which the data may be manipulated by the CPU 26, the 3D processor 34, or a combination of the two. According to one embodiment of the present invention, physical object data 62, motion capture data 64, and simulation rule data 66 are used together, though it is to be understood that these types of data may be used in other combinations or alone. For example, according to some embodiments of the present invention, it may be beneficial to combine physical object data 62 and simulation rule data 66 without any need for motion capture data 64.

Physical object data 62 may comprise a variety of types of information about physical objects whose motions and interactions are to be simulated. The mass, dimensions, elasticity, and center of gravity of a simulated object may be taken together or separately to comprise the physical object data 62. According to some embodiments of the present invention, a physical object may comprise several individually movable portions. Such an embodiment may be necessary in simulating a person, a car, or a horse. In these embodiments, physical object data may include information such as the dimensions of individual portions, the location of joints, the masses of individual body portions, the number of individual portions of the object, and the like.

Physical object data 62 may be used in combination with manual animation of simulated objects, or it may be combined with motion capture data 64. Further, a combination of motion capture data 64 and manual animation may be used to create more realistic or more stylized depictions of game activities. Motion capture data 64 includes data that is acquired from observation of physical objects, actors, or animals. Several techniques are available for capturing digital information on motion, including optical and electronic motion capture as is known in the field of computer animation. Using motion capture data in simulating a game activity according to the present invention helps to lend a realistic appearance to simulated real-world events, such that simulated objects appear to interact as they would in the real world. Motion capture data may be collected of a figure running, jumping, climbing, or performing any other motion effecting a result which could be wagered upon.

Simulation rule data 66 comprises a set of parameters describing how simulated objects should work together within a simulated environment to provide an entertaining activity for wagering. According to one embodiment of the present invention, the simulation rule data comprises rule data designed to mimic as closely as possible activities within the real world. For example, in a gaming machine designed to simulate a roulette game, the simulation world may comprise a roulette ball and a roulette wheel, and the rule data would specify the strength of gravity tending to pull the simulated roulette ball downward toward the wheel. Other rule data would include information on how the roulette ball interacts with the roulette table. In this example, the rule data would interact with information on the mass, dimensions, and elasticity of the roulette ball and roulette table to enable a realistic simulation of the interaction of the roulette ball with the roulette wheel. A simulation world according to the present invention can be encompass a variety of scopes, from the entire universe down to the modeling of a single object within a game world, such that anything that one would want to put a wager on could be simulated by a gaming machine according to the present invention.

According to one embodiment of the present invention, the simulation rule data 66 are designed such that they fit parameters defining certain outcomes desired by a game designer. For example, in the roulette embodiment discussed above, the game designer may force the simulation rule data 66, along with the physical object data 62, to present a one-in-thirty-eight chance that the roulette ball will fall next to any number in the roulette wheel. Following the determination of desired probabilities of specific outcomes, the physical object data 62 and simulation rule data 66 can be developed either manually or automatically to cause the desired outcome probability distribution. Further, the simulation rule data 66 may be modified using random values such that pre-defined organizations of physical objects do not repeatedly give the same gaming outcomes. According to another embodiment of the present invention, the distribution of probabilities of simulated event outcomes is dependent solely upon the simulated physical world developed through an interaction between the physical object data 62 and the simulated rule data 66.

The simulated rule data 66 may be modified by bounds to control the possible wager outcomes of a gaming system according to the present invention. Further, according to one embodiment of the present invention, data relating to objects forming part of the simulation world, such as backgrounds and room dimensions, may be treated as physical object data, with the simulation rule data 66 providing the rules under which all simulated objects interact with each other and with forces within the simulated world. Visual depictions of simulated gaming activities may be shown at increased or decreased speeds in a forward or reverse direction for replays, and further the camera angle of the visual depictions may be altered to give the player an optimum view of the gaming activity.

The physical object data 62, motion capture data 64, and simulation rule data 66 may be stored in the system memory 30 (shown in FIG. 2), which may be expanded over time or updated through communication with the communication module 24. The data are used by the CPU 26 and/or the 3D processor 34, working together or separately, to produce a mathematical simulation of gaming activity as shown at block 68. The mathematical simulation forms the underlying basis for a graphical depiction of simulated activity as shown at block 70. The graphical depiction of simulated activity is displayed to the player so that the wager outcome 72 is known to the player.

Figure 6:
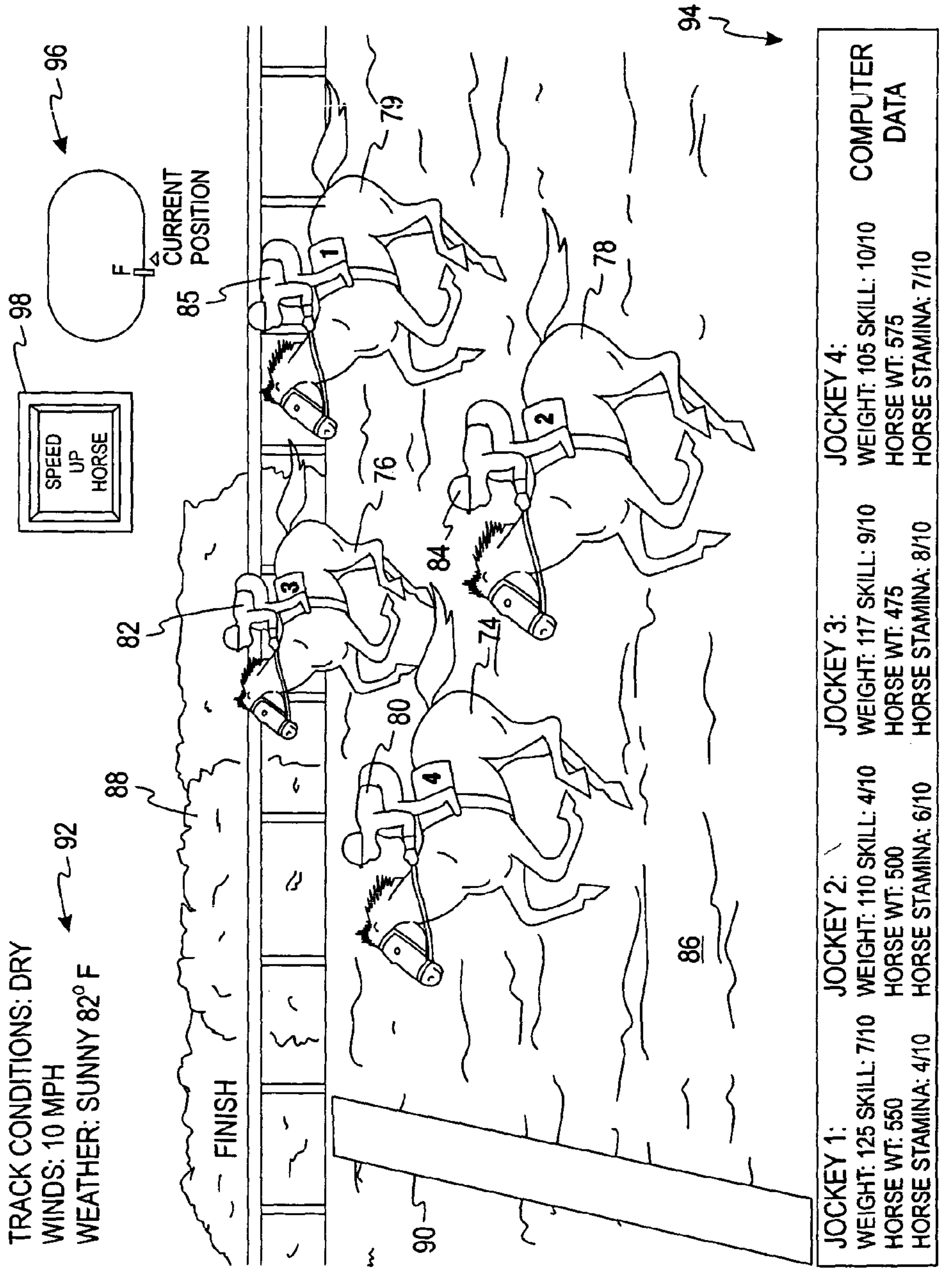
FIG. 6 is a screen view showing a gaming screen according to one embodiment of the present invention.

Turning now to FIG. 6, a screen view is shown illustrating a horse racing embodiment of a wagering experience according to the present invention. In this embodiment, the player is presented with a number of physical gaming objects, including the horses 74, 76, 78, and 79 and the jockeys 80, 82, 84, and 85. Each of these objects may be modeled with physical object data 62 with respect to their weights, dimensions, and skill levels, and motion captured to portray realistic movement to the player. The horses race on a track 86, whose specifications may be contained within the simulation rule data 66. Track specifications may include the type of track (gravel, sand, grass, etc.), the weather conditions of the track, and other factors. Further, environmental effects such as wind or rain may be modeled within the simulation rule data 66, with these parameters affecting race outcomes. Other track items, such as bushes 88, may be modeled and may interact with the horses and jockeys, thereby affecting the race outcome. The overall effect of mathematically modeling pertinent elements of the horse race is to present a realistic race outcome to the player, thereby increasing the player's interest in continued wagering.

The screen shown in FIG. 6 shows that the four-horse 74 is leading the race and about to cross the finish line 90 first. This result may have arisen as a result of several events earlier in the race, which have already been realistically mathematically simulated and graphically presented to the player. For example, the three-horse 76 may have expended too much energy early in the race, falling behind in the final stretch. The two-horse 78 may not have been driven hard enough by its jockey 84 and therefore not expended the energy necessary to win the race. The one-horse 79 may have been impeded by poor track conditions. Further, horses not shown may have collided during the race, taking them out of contention. According to one embodiment of the present invention, tendencies such as these are modeled and preserved from game to game, such that a player may grow accustomed to the performance of certain horses and jockeys and posit predictions as to how a race will conclude. Thus, the game objects may be persistent mathematical models which stay the same over time or change slightly, just as real-world objects would. Game objects such as horses and jockeys may also be transferred between game machines, behaving as mathematical "objects" and being acted upon by similar forces in other game machines.

Additional data may be shown as part of the gaming experience in order to give a player more thorough information and to increase the apparent realism of the game. FIG. 6 shows track conditions 92, jockey and horse information 94, and the current position on a track map 96 as additional information upon which a player may make gaming decisions. Further, a player may be provided with an opportunity to interact with the game during game performance. In the embodiment of FIG. 6, a "speed up horse" button 98 is incorporated on the display in a touch-screen embodiment in order to give the player the opportunity to push a particular horse harder on certain stretches of the race. This enables a further balancing of risk versus reward for the player, as pushing a horse too hard may tire the horse out earlier, and not pushing the horse hard enough may result in poor performance. The "speed up horse button" may alternatively be duplicated as a standard button on the gaming device 10 or implemented solely as a standard button.

The present invention may be used to model any objects or events used for wagering purposes. For example, physical object data 62 may include data on playing cards and the simulation rule data 66 may include information describing how shuffling affects the cards, or how a table surface affects the cards as the cards are dealt. The principles of the present invention may be applied to a variety of gaming events, including but not limited to vehicle races, casino table games such as roulette, wheel of fortune, craps, and card games, and sporting events such as baseball, football, basketball, and hockey games.

Turning now to FIGS. 7-9, a roulette game utilizing the principles of the present invention is shown. In roulette, a ball 100, launched by a croupier, orbits horizontally in a stator 102 until it slows down enough to fall towards the rotor 104 at the center where it eventually comes to rest in one of thirty-eight pockets 106. The following computational example focuses on circular motion in the stator.

The position of the ball 100 is a function of several variables that describe movement in 3 dimensions, including, but not limited to:

$r_0$, the initial position vector.

r, the position vector.

$v_0$, the initial velocity.

v, the velocity vector.

a, the acceleration vector.

f, the frictional force.

The velocity will be expressed in terms of a unit vector tangent to the stator, $e_t$, and the acceleration will be expressed in terms of $e_t$ and $e_n$, where $e_n$ is a unit vector normal to the side of the stator 102.

We then have the following relations among the variables:

$$v=dr/dt\ e_t$$

$$a=a_t\, e_n+a_n\, e_t+a_g\, e_g$$

where $a_t$ is the tangential component of acceleration, $a_n$ is the normal component of the acceleration and $a_g$ is the gravitational acceleration (expressed in combination with a gravity unit vector $e_g$). $a_n$ is a function of $-v^2/r$ where r is the radius of the stator 102 at the height of the ball 100. These vectors are shown in FIG. 7*b*. FIGS. 8*b* and 9*b* show the tangential and normal components of the velocity and acceleration vectors at time zero and then again after the ball has slowed.

The roulette embodiment is used herein as an example of the types of computations and physical interactions that can be modeled using the present invention; more complex interactions may also be modeled, and indeed more complexity, including information such as the friction of the ball 100 moving in the stator 102, the curvatures of the ball 100 and the stator 102 at the point of contact with the outer cylinder of the stator 102, and the curvature of the point of contact with the ramp area between the stator 102 and the ball 100 could be used to give a more complete modeling of a roulette game.

For more complicated gaming systems, like horse racing, there may be more complicated choices about which parts of the system to model in detail and which to model more abstractly. For example, it may be desirable for realism to have a complicated model of the interaction between the mud on the track and the foot of the horse, but for other calculations it might be desirable to use the center of gravity of the horse for most calculations. According to one embodiment, independent of the complications of the model, if the players place bets without knowing which starting position the horse has been given, then there will be a uniform distribution of outcomes if the starting conditions are uniformly distributed and the race conditions are also independent of the horse.

While such gaming systems could be built as deterministic state machines on a computer, where repeating the precise initial conditions will lead to precisely the same outcome, if the initial conditions are chosen with sufficient randomness, the outcome will be so theoretically removed from the initial conditions that even if the initial condition is known at the point of its use, there will generally be no theory that will connect this to a specific outcome, unless actually computing the trajectory using the 3D physics engine can be considered a theory. Another level of unpredictability could be introduced by using random variables that potentially influenced the movement. If, for example, roulette pockets randomly changed their depth while the ball was falling toward the rotor if obstacles are hit, then the probability of the ball landing and staying in a particular pocket would become a function of its depth. This would introduce an inherently unpredictable element into the evolution of an otherwise deterministic (but still unpredictable) system.

According to one embodiment of the present invention, mathematical modeling and graphical depictions are used to model and display an entire sports season, providing players with the ability to wager on every game in a simulated season and to wager on season-long outcomes as well. According to another embodiment of the present invention, a player may invest in a mathematically modeled sports participant, team, or automobile in much the same way that real-world team owners invest in these entities. Having the three-dimensional model preserved throughout a simulated season, a player's fortunes may rise and fall in conjunction with the interaction of these simulated objects with simulation worlds and rules, while viewing game activities as a realistic depiction of three-dimensional action. Such gaming may take place in a simulated gaming "arena" with large screens showing gaming activities and individual player kiosks or remote controls for the input of wagering information.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of operating a gaming system comprising:

storing simulation rule data and physical object data, the physical object data defining physical objects including a ball and a wheel having a plurality of pockets, the simulation rule data defining rules of a simulated world that affect the physical objects including how the ball interacts with the wheel, the simulation rule data and the physical object data being selected to yield a pre-selected desired outcome probability distribution of a plurality of possible simulated outcomes;

accepting a wager to play a wagering game;

based on the interaction of the physical object data and the simulation rule data, simulating actions of the physical ball and wheel objects within the simulated world to randomly select a simulated outcome of the ball landing in a pocket after the wheel is rotated from the plurality of possible simulated outcomes of the plurality of pockets according to the desired outcome probability distribution;

graphically rendering the actions and the simulated outcome such that the desired outcome probability distribution is readily apparent and discernible to a player of the wagering game; and providing an award if the selected simulated outcome represents a winning condition.

2. The method of claim 1, wherein the simulating and the rendering occur simultaneously such that the actions and the simulated outcome are rendered in real time.

3. The method of claim 1, wherein the simulating occurs prior to the rendering such that the simulated outcome is selected prior to being rendered.

4. The method of claim 1, further including randomly modifying the simulation rule data such that pre-defined organizations of the physical objects provide different ones of the simulated outcomes.

5. The method of claim 1, further including modifying the simulation rule data by bounds to control the possible simulated outcomes.

6. The method of claim 1, wherein the simulating and the rendering are performed by a 3D processor that receives the simulation rule data and the physical object data from a central processor.

7. The method of claim 6, wherein the simulation rule data includes common rule data applicable to different types of wagering games such that the 3D processor need not be updated with the common rule data for the different types of wagering games.

8. The method of claim 1, wherein the simulating and the rendering occur, in part, simultaneously but the simulated outcome is selected prior to being rendered.

9. The method of claim 1, wherein the simulating commences from a randomly chosen initial condition.

10. The method of claim 1, wherein the simulating includes influencing the actions with a random variable.

11. A gaming system comprising:

a memory for storing simulation rule data and physical object data, the physical object data defining physical objects including a ball and a wheel having a plurality of pockets, the simulation rule data defining rules of a simulated world that affect the physical objects including how the ball interacts with the wheel, the simulation rule data and the physical object data being selected to yield a pre-selected desired outcome probability distribution of a plurality of possible simulated outcomes;

a wager input device for receiving a wager to play a wagering game;

a display; and a controller operative to based on the interaction of the physical object data and the simulation rule data, simulate actions of the physical ball and wheel objects within the simulated world to randomly select a simulated outcome of the ball landing in a pocket after the wheel is rotated from a plurality of possible simulated outcomes of the plurality of pockets according to the desired outcome probability distribution;

graphically render the actions and the simulated outcome on the display such that the desired outcome probability distribution is readily apparent and discernible to a player of the wagering game; and provide an award if the selected simulated outcome represents a winning condition.

12. The system of claim 11, wherein the controller is operative to simulate and render simultaneously such that the actions and the simulated outcome are rendered on the display in real time.

13. The system of claim 11, wherein the controller is operative to simulate prior to rendering such that the simulated outcome is selected prior to being rendered on the display.

14. The system of claim 11, wherein the controller is operative to randomly modify the simulation rule data such that pre-defined organizations of the physical objects provide different ones of the simulated outcomes.

15. The system of claim 11, wherein the controller is operative to modify the simulation rule data by bounds to control the possible simulated outcomes.

16. The system of claim 11, wherein the controller includes a central processor and a 3D processor, the 3D processor being operative to receive the simulation rule data and the physical object data from the central processor and then simulate and render the actions and simulated outcome on the display.

17. The system of claim 16, wherein the simulation rule data includes common rule data applicable to different types of wagering games such that the 3D processor need not be updated with the common rule data for the different types.

18. The system of claim 11, wherein the controller is operative to simulate and render, in part, simultaneously but select the simulated outcome prior to being rendered.

19. The system of claim 11, wherein the controller is operative to simulate the actions commencing from a randomly chosen initial condition.

20. The system of claim 11, wherein the controller is operative to influence the actions with a random variable.

21. A computer readable storage medium encoded with instructions for directing a gaming system to perform the method of claim 1.

22. A method of operating a gaming system simulating a horse race comprising:

storing simulation rule data and physical object data, the physical object data defining physical objects including a plurality of racers and a track, the simulation rule data defining rules of a simulated world that affect the physical objects including the skill of the racers and the conditions of the track, the simulation rule data and the physical object data being selected to yield a pre-selected desired outcome probability distribution of a plurality of possible simulated outcomes of the winner of a race between the plurality of racers on the track;

accepting a wager to play a wagering game;

based on the interaction of the physical object data and the simulation rule data, simulating actions of the physical racer objects within the simulated track world to randomly select a simulated outcome from the plurality of possible simulated outcomes according to the desired outcome probability distribution;

graphically rendering the actions and the simulated outcome such that the desired outcome probability distribution is readily apparent and discernible to a player of the wagering game based on the racing of the plurality of racers; and providing an award if the selected simulated outcome represents a winning condition.

* * * * *